United States Patent [19]

Thibaut

[11] 4,007,409
[45] Feb. 8, 1977

[54] METHOD OF AND DEVICE FOR CONTROLLING A d.c. WASHING MACHINE MOTOR

[75] Inventor: Yves Albert Daniel Thibaut, Amiens, France

[73] Assignee: U.S. Philips Corporation, New York, N.Y.

[22] Filed: Dec. 6, 1974

[21] Appl. No.: 530,168

[30] Foreign Application Priority Data

Dec. 10, 1973 France .............................. 73.43905

[52] U.S. Cl. .............................. 318/459; 318/461; 317/22
[51] Int. Cl.² .......................................... G05B 1/00
[58] Field of Search .................. 317/9 A, 9 AC, 22; 318/459, 461; 307/120, 121

[56] References Cited

UNITED STATES PATENTS

| 3,633,073 | 1/1972 | Day et al. .............................. 317/22 |
| 3,742,302 | 6/1973 | Neill ...................................... 317/22 |
| 3,742,303 | 6/1973 | Dageford .............................. 317/22 |

*Primary Examiner*—Robert K. Schaffer
*Assistant Examiner*—John J. Feldhaus
*Attorney, Agent, or Firm*—Frank R. Trifari; David R. Treacy

[57] ABSTRACT

A method of controlling the operation of a d.c. motor of a washing machine by energizing or de-energizing a reference voltage generator. The back-e.m.f. of the motor is compared with the reference voltage. The a.c. supply of the generator is controlled by contacts of detectors for the operating conditions of the machine, such as temperature of the suds or of electronic components, unbalance, opening of the door etc.

6 Claims, 4 Drawing Figures

4,007,409

METHOD OF AND DEVICE FOR CONTROLLING A D.C. WASHING MACHINE MOTOR

BACKGROUND OF THE INVENTION

The invention relates to a method of controlling a d.c. motor of a washing machine in dependence on a parameter which is not exclusively related to motor speed. In such a method the motor is energized from an alternating current supply through a rectifier bridge which comprises two diodes and two thyristors, the thyristors being controlled by a signal which is supplied by an electronic speed regulator. During at least one specific operating cycle of the machine the timer switches on a control device, which supplies a motor de-energize signal to the regulator for stopping the motor when the motor speed drops below a certain value, the control device being actuated by a motor stop signal supplied from a comparator which continually receives both the back-e.m.f. voltage of the motor and a rectified reference voltage from a reference voltage generator.

Such a device for controlling the operation of the motor is particularly useful in a machine which accelerates after a laundry distribution cycle. Such a method of starting up is employed if the weight of the machine is to be reduced or if the spindrying speed is to be increased. It is then necessary to take special care that the mass of laundry is distributed as uniformly as possible along the walls of the drum so as to avoid unbalance. When the mains supply of the machine is interrupted, the motor may either stop because the failure lasts some time, or may slow down when the failure is very brief. In the first case the laundry drops again onto the bottom of the drum; and during speeding up the unbalance will become more severe, depending on the wetness of the laundry. In the second case the loss of speed of the drum may be such that the result will be the same as if it had stopped.

Control of the motor by the control device in the event of a voltage failure is based on the comparison of two voltages: a negative voltage produced by the back-e.m.f. of the motor when the motor has reached its normal operating condition for the relevant cycle and a full-wave rectified reference voltage which is derived from the supply circuit of the regulator and an antihunting device. The reference voltage is adjusted to a value lower than that of the BEMF voltage which corresponds to the drum speed at which the laundry no longer remains at the periphery of the drum.

SUMMARY OF THE INVENTION

It is an object of the invention to provide a method of controlling a d.c. motor of a washing machine in dependence on a parameter which is not exclusively related to the motor speed and to achieve this by switching a reference voltage generator on or off. The various detectors for parameters such as the motor temperature or the temperature of electronic components, the temperature of the suds, opening of the door, the water level, tub displacement etc. have at least one make or break contact in series with the a.c. supply circuit of the reference voltage generator.

The method according to the invention of controlling a d.c. motor of a washing machine is characterized in that the control device is activated by modifying the supply voltage of a reference voltage generator, said modification being controlled by at least one contact of at least one detector for a variation of an operating parameter of the machine.

The method is further characterized in that the reference voltage generator is energized when the tub is empty.

The device embodying said method is characterized in that a reference voltage generator comprises at least one switched a.c. input which corresponds to at least one predetermined reference voltage at the output.

In various embodiments:

at least one make or break contact for the a.c. supply of the reference voltage generator belongs to at least one detector for an operating parameter of the machine, at least one make contact of the a.c. supply of the reference voltage generator is the tub-empty contact of a detector for the water level in the tub of the machine, at least one make or break contact of the power supply of the reference voltage generator is a contact of a detector for the amplitude of tub movements, at least one make or break contact of the power of the reference voltage generator is a contact of thermal senser which controls the temperature of the washing water, at least one make or break contact of the power supply of the reference voltage generator is a safety contact for the door of the washing machine, at least one make or break contact of the power supply of the reference voltage generator is a contact of a thermal senser which is disposed on an element of the washing machine whose heating resistance is connected in series with the motor supply, which element is subject to overheating as a result of a malfunction.

The following descriptions and drawings are given by way of example in order that the invention may be more fully understood.

DESCRIPTION OF THE PREFERRED EMBODIMENTS

Figure 1:
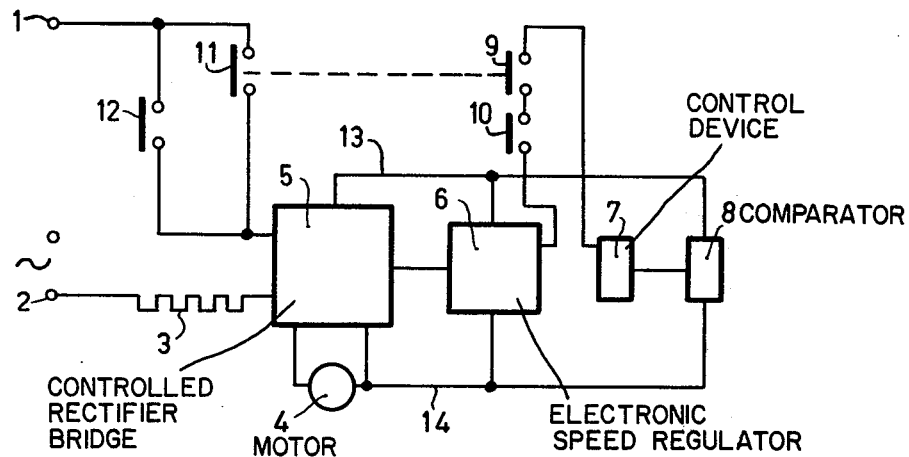
FIG. 1 is a block diagram of a prior-art device.

FIG. 1 represents a d.c. motor control system in accordance with a device described in U.S. Pat. No. 3,939,673 issued Feb. 24, 1976 to the instant applicant. The sole object of said method is to avoid the unbalance which occurs in washing machines during spindrying after a voluntary or involuntary interruption of the operation of the machine or after the spindrying speed has dropped below a predetermined value, said method consisting of refilling of the tub with water and acceleration to washing speed before acceleration to spindrying speed with the tub still filled with water.

A permanent-magnet d.c. motor 4 is energized from the a.c. mains 1, 2 through a rectifier bridge 5 which comprises two diodes and two thyristors. The rectifier bridge 5 is connected in series with an immersion heater 3. The thyristors of the bridge 5 are controlled by a regulator 6 which compares the voltage produced by the back-e.m.f. (BEMF) of the motor when said motor is not energized, with reference voltages for the washing and spindrying speeds. The input of the reference voltages to the regulator 6 is represented by the line 13 and that of the BEMF voltage by the line 14. In order to require that a re-starting cycle proceed only with filled tub so as to avoid unbalance if an interruption of the power supply of the machine, has occurred, a control device 7 constituted by, for example, a transistor, receives its actuating, or motor stop, signal from a comparator 8. The comparator 8 via the lines 13 and 14 respectively receives a d.c. reference voltage and the voltage produced by the back-e.m.f. of the motor. When the value of the BEMF voltage of the motor becomes lower than that of the reference voltage, the control device via the regulator 6 causes the thyristors of the power supply 5 to be cut off and hence the motor is stopped. In order to allow the motor to speed up to spindrying and to avoid power supply blocking control before the motor has reached a speed which suffices to avoid blocking of the power supply, the output of the control device is connected to the regulator through the contacts 9 and 10. The contact 9 is mechanically coupled to the contact 11 of the pressostat which is only closed when the tub is empty; the contact 10 is a timer contact which is closed for the spindrying cycle. The contact 12 which belongs to the timer is closed during spindrying and enables the motor to be supplied, ensuring that power supply is continued when the contact 11 of the pressostat opens after drainage.

Thus, such a device allows two parameters to be controlled: the motor speed and refilling of the tub with water. The other parameters such as the temperature of the suds, the temperature of the electronic components or of the motor, or the amplitude of the vibrations of the tub can only be controlled by means of detectors whose contacts control the main power supply of the machine. The same applies to a door opening safety device which also steps the machine when the door is opened during operation. It is not possible to achieve the previously outlined goals by connecting said contacts in series with the output of the control device, for the control signal is very weak; therefore, the method according to the invention enables the motor to be blocked by means of these different parameters which no longer act on the weak signal supplied by the control device but rather act on the supply of the reference voltage which is an input to the comparator.

Figure 2:
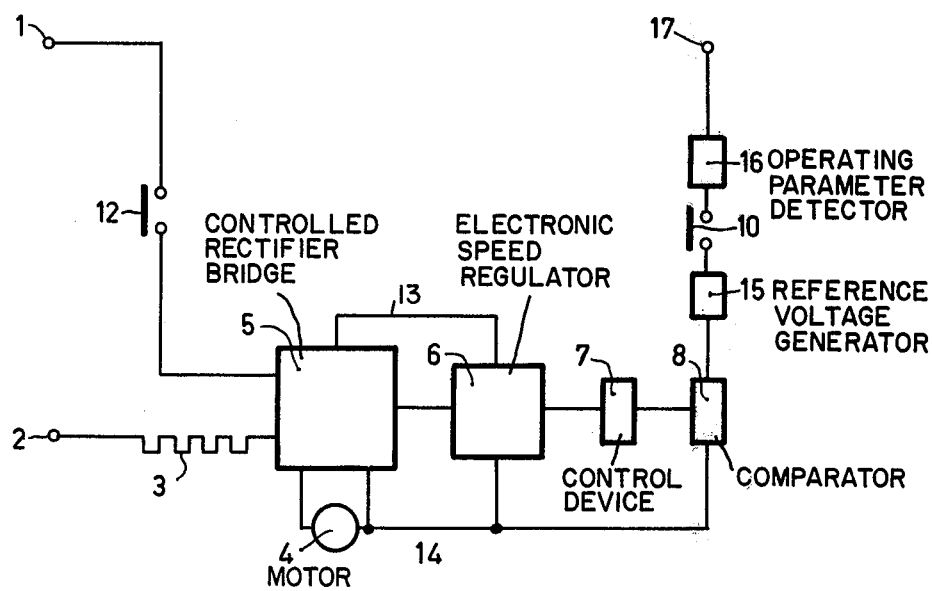
FIG. 2 is a block diagram of a control system according to the invention.

FIG. 2 shows a block diagram of a device embodying the method according to the invention. In this diagram the devices and elements which resemble those in the known arrangement have been given the same reference numerals. The permanent magnet d.c. motor 4 is supplied from the a.c. mains 1, 2 through a rectifier bridge 5 which comprises two diodes and two thyristors. The rectifier bridge 5 is connected in series with the immersion heater 3. The thyristors of the bridge 5 are controlled by a regulator 6 which compares the voltage produced by the BEMF of the motor with reference voltages for the washing and spindrying speeds. The input of the reference voltages to the regulator 6 is represented by the line 13 and that of the BEMF voltage by the line 14. The control device 7, which in a known embodiment is constituted by a transistor, receives a voltage at its base which is supplied by the comparator 8. The comparator 8 receives the BEMF voltage from the motor over the line 14, and compares that voltage with a rectified reference voltage supplied by the reference voltage generator 15. The reference voltage generator 15 is supplied with alternating current from the terminal 17 through the detectors 16 for detecting operating parameters of the machine other than the speed of rotation of the motor and, finally, through a contact 10 which belongs to the timer rectified-voltage generator to be switched on or off.

Figure 3:
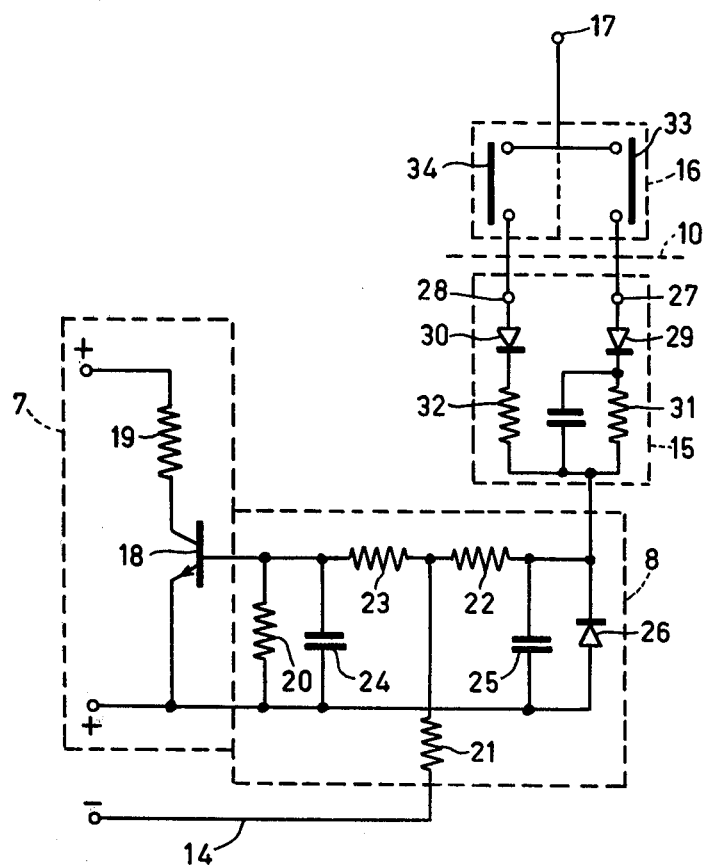
FIG. 3 is an electronic circuit diagram of the reference voltage generator, comparator and control unit of FIG. 2.

FIG. 3 shows a circuit diagram of the control unit of the electronic regulator. The devices of the block diagram in FIG. 2 are delimited by dash lines and have the same reference numerals. Thus, the control device 7 is constituted by a transistor whose collector is connected through a resistor 19 to provide a motor-de-energize signal to a control electrode of the tetrode thyristor (not shown) of the regulator 6, the emitter receiving the supply voltage from the motor.

The base of the transistor 18 is supplied with a voltage which is the sum of the voltages across the resistors 20 and 23, which come from the +terminal of the motor supply, and the voltage which is the result of the comparison of the BEMF voltage of the motor (line 14 and resistor 21) with a reference voltage obtained from the generator 15 through the resistor 22. Capacitors 24 and 25 are polarized capacitors and the diode 26 is a protection diode.

The reference voltage generator 15 is shown with two inputs 27 and 28. Each of these inputs includes a diode 29 which rectifies the alternating voltage applied to its terminals through the contacts of the detector switches 16. Each branch of the voltage generator constituted by the elements 29,31 and 30, 32 supplies a different reference voltage. Thus the branch 27,29,31 supplies a rectified voltage which is equivalent to the BEMF voltage of the motor at a speed which at least equals 70 r.p.m., while the branch 28,30,32 supplies a voltage equivalent to the BEMF voltage of the motor at some given speed lower than 50 r.p.m.

These inputs of different value of the reference voltage generator are applied by the contacts of the detectors 16 depending on whether the motor speed during washing (50 r.p.m.) or during sprindrying is to be controlled.

The operation of the devices 7,8 and 15 of FIG. 3 is as follows:

The circuit will be considered which is constituted by the terminal 17, the contact 33, the terminals 27, the diode 29 and the resistor 31 (the capacitor which is shown but which has no reference numeral is a timing-base capacitor and is irrelevant for the description of the operation). When the terminal 27 is not energized, the base of the transistor 18 receives a negative voltage produced by the BEMF of the motor. As a result, the transistor remains cut off permanently and the control of the thyristors which are connected to the collector through the resistor 19 is not influenced: the power supply functions normally.

After speeding up to spindrying, the application of an alternating voltage to the terminal 27 has no effect, for the motor voltage which is supplied over line 14 and resistor 21 is more negative than the opposing voltage which is positive because rectification by the diode 29, and the transistor 18 remains cut off.

If the mains voltage at the terminal 27 is interrupted for a time which is sufficiently long for the BEMF to assume a low value (simply by the motor slowing down), there will be an instant at which the positive voltage supplied through circuit 29,31 and 22 becomes more significant, and a motor stop signal is applied to the base of transistor 18: the transistor 18 then conducts. Thus, it blocks the operation of the thyristors and consequently the motor supply.

If the machine is to be re-started, it suffices to interrupt the circuit which supplies the terminal 27, for example by re-filling the tub, and the cycle is then repeated. The afore-described operation corresponds to a voltage failure protection and ensures that the motor cannot speed up again to spindrying speed without a prior laundry distribution cycle, which may be qualified as internal control of the motor supply.

The devices provided enable external control of the power supply by means of the contacts of a detector for variations of an operating parameter of the machine. Typical parameters are for example the water level, the temperature of the suds, the displacement of the tub, opening of the door, blocking of the drum or motor.

The dash line 10 (FIG. 3) between the detector elements 16 and the rectified-voltage generator 15 corresponds to contact 10 in FIG. 2 and belongs to the timer.

Control of the operation of the motor in dependence on the water level in the tub may be obtained, when the contact 33 is assumed to belong to a water level sensor or pressostat. If the thyristors of the motor supply should not be blocked as soon as the machine speeds up to spindrying, it is necessary that the motor has reached a certain speed (which has been fixed at approx. 1200 r.p.m., or 80 r.p.m. for the drum of the machine), so as to ensure that the BEMF of the motor, which comes from 21 and 23, exceeds the reference voltage. To accomplish this, terminal 27 is not energized during said acceleration phase. For this purpose, the following switching process is realised: the terminal 27 is energized through the contact 10 which belongs to the timer and which is closed during spindrying only. The high-level pressostat of the machine has two contacts, of which one contact 33 corresponds to an empty tub and a second contact, not shown, corresponds to a filled tub. The contact 33 is connected in series with the contact 10 of the timer.

During acceleration to spindrying, the pressostat is in the filled-tub position, i.e., contact 33 is open. The machine speeds up normally. After some tens of seconds, while the tub is gradually filled, the pressostat returns to the empty position, and contact 33 is then closed. Through contact 33 and contact 10 of the timer the alternating voltage is applied to input terminal 27 of the reference voltage generator. Two cases are to be considered:

the speed of the drum is higher than 80 r.p.m.; in this case the voltage failure has no effect, and the machine continues to speed up to spindrying speed, the speed of the drum is lower than 80 r.p.m.; in this case the machine is blocked and it is impossible to start the machine except if 33 is open, i.e. when the tub is full. If starting in the spindrying mode is attempted with an empty tub, whilst contact 33 is closed, the system is blocked at once and the machine cannot start.

Control as a function of the temperature of the suds is applied when the laundry should not be stirred during special cycles. For example, for woollens, the washing movement should be minimal. The reference voltage generator will be energized at 28 through the timer contact 10 (FIG. 3) and through a contact 34 which in this case belongs to the thermostat. Said thermostat contact opens when the required temperature is attained, the motor supply thus being blocked until the temperature is reached. Once the washing water has the desired temperature, contact 34 of the thermostat opens, the alternating voltage at terminal 28 cuts out and the motor is immediately started for the next operations at washing speed.

In a similar way, the motor can be controlled in dependence on the displacement of the tub. It is known that instabilities owing to an incorrect distribution of the lead of laundry in the drum occur at specific speeds, which are called critical speeds. In order to avoid damage to the machines, it is necessary to stop the machine very rapidly when the amplitude of displacements of the washing unit are excessive. For this a contact, represented by contact 33 in FIG. 3, is disposed at a specific location in the path of the washing unit during substantial displacements, which will result in automatic stoppage in dangerous cases. As the contact 33 is a self-releasing contact (i.e. it returns immediately to its original position, which is "contact open"), it is evident that when the washing unit actuates the contact 33, a short pulse is applied via contact 10 of the timer to the rectified-voltage generator and subsequently to the motor supply, the motor being stopped immediately. The conventional methods of acceleration to spindrying can then function normally.

Control of the motor supply when the door is opened is achieved in the same way as in the previous case, by disposing a circuit breaker 33 or 34 on the door of the machine. In accordance with the washing cycle of the machine, the machine is stopped through contact 33, if the machine is in the spindrying mode, and through contact 34 during the washing mode.

It is equally possible to ensure that the power supply circuit of the motor is protected when the drum is blocked. It is known from French Patent Specification No. 2,009,665 or British Patent Specification No. 1,354,367 that the circuit of the permanent-magnet motor is protected both by the limitation of the current owing to the series resistance and, as known from U.S. Pat. No. 3,638,090, by a thermal protection device consisting of a temperature detector which is disposed underneath the heating element and which interrupts the power supply when the temperature exceeds a preset threshold. The same result can be obtained by including the contacts of the temperature detector in the power supply circuit of the reference voltage generator at 33 or 34 or in the two branches (FIG. 3). For example, if the detector is disposed close to the heating element, or in the interior of the motor or on the heat sinks of power elements of the motor supply, the motor supply will be blocked electronically when the temperature becomes too high, as soon as the contact of the detector is closed.

The method and the device according to the invention, moreover enable protection of the machine in the event that the rotor of the motor is blocked. The operating principle has been described hereinbefore of pressostat control which allows acceleration to spindrying only when the tub is filled with water. If the motor or the drum is blocked, the motor is energized after the acceleration cycle. After a certain quantity of water has been drained, contact 33 of the pressostat will close. At this very instant, the blocking command occurs, to block the power supply and to de-energize the motor. FIG. 3 shows that if the back-e.m.f. is zero, transistor 18 is conducting and the circuit 18–19 through the tetrode transistor of the device 6 (FIG. 2) supplies a voltage for blocking the thyristors. Thus, when the motor is blocked full protection of the motor, of the electronic circuitry and of the series resistor 3 (FIG. 2)

is provided, as long as the fault lasts, and any damage to these elements of the machine is avoided.

Figure 4:
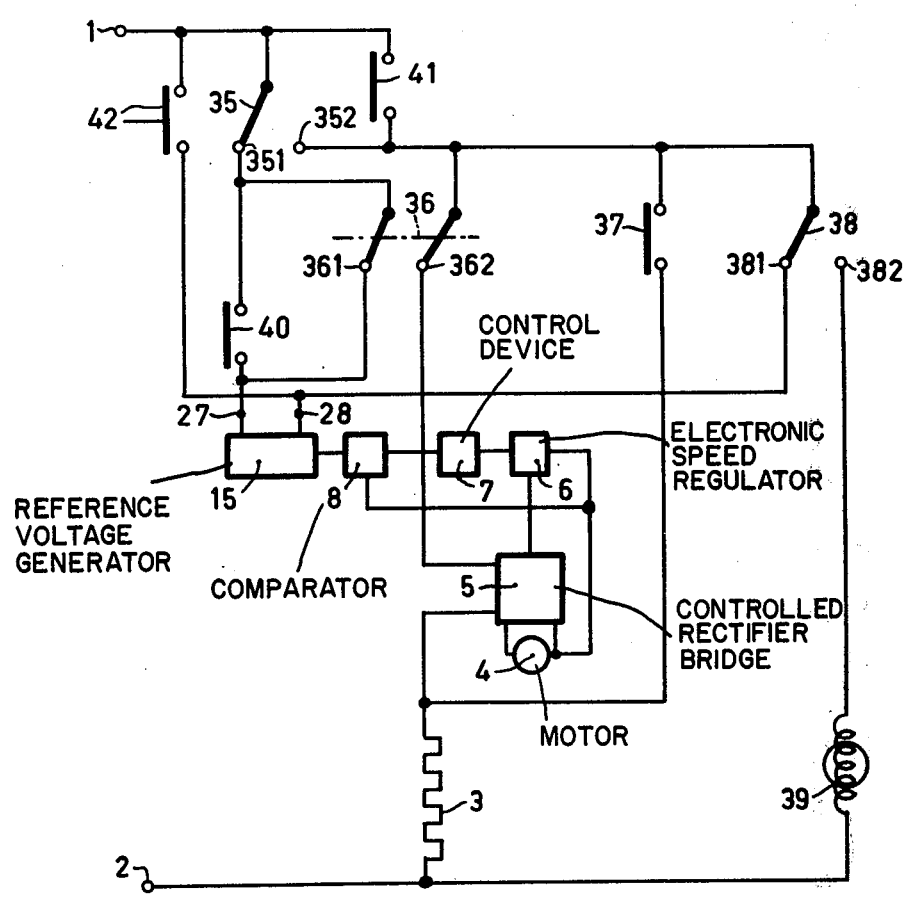
FIG. 4 is a block diagram of a device for controlling a motor of a washing machine in dependence on several parameters.

FIG. 4 is a simplified diagram of an embodiment of a control system for the rotation of the motor of a washing machine in dependence on a plurality of operating parameters.

The input terminal 27 of the reference voltage generator 15 carries a rectified voltage equal to that produced by the back-e.m.f. of the motor at a drum speed of 70 r.p.m. The input terminal 28 carries a rectified voltage which corresponds to a drum speed lower than 50 r.p.m.

The machine is started with filled tub and closed door, the pressostat 35 being in position 352 for the filled tub and the door safety device 36 being in position 362 for the door closed; the power supply 5 of the motor is then connected directly to the mains terminal 1 and, through the motor resistance 3, to the mains terminal 2. The washing water is heated by closing contact 37 of the timer. When the water has not yet attained the desired temperature, the thermostat 38 remains in the cold position 381 and energizes the reference voltage generator 15; since the motor has not yet begun the alternating washing movement, its speed is lower than 50 rpm, thus causing the rectifier bridge 5 to be cut off. The timer motor 39 which is also connected in series with the thermostat 38 is not energized, and does not start until the thermostat is in latter position 382; in this position terminal 28 is no longer energized, the back-e.m.f. of the motor is then higher than the reference voltage and the normal power supply for the washing speed is then applied to the motor terminals.

When door protection contact 362 opens, the power supply of the rectifier bridge is interrupted, which bridge constitutes the power supply 5 of the motor, so that the motor is stopped. When the door is closed, the rectifier 5 is again energized by the closed contact 362. However, contact 361 closes again and applies a voltage to 27 which blocks the power supply. Starting takes place after filling, upon closure of contact 352 of the pressostat.

Protection against a blocked rotor is effected by the disappearance of the back-e.m.f. of the motor. The reference voltage generator 15, which is always energized via the terminal 27, will therefore always have a voltage which is higher than the back-e.m.f. of the motor, so that the power supply will be cut off when the tub is empty and the motor is not rotating.

During spindrying the timer contact 40 as well as the door protection contact 361 are closed. Since this type of machine is started when the tub is filled with water, a contact 41 allows the motor to speed up to spin-drying. After a very short time, the pressostat 35 changes over to the empty-position 351 and allows the terminal 27 of the rectified voltage generator 15 to be energized.

The safety contact 42 for instability of the tub of the machine, upon actuation, supplies a pulse which blocks the power supply. Starting will take place after filling upon closure of contact 352 of the pressostat.

What is claimed is:

1. A method of controlling a d.c. motor of a washing machine in dependence on motor speed and at least one other parameter, by energizing a motor from a controlled rectifying bridge circuit supplied from an alternating current source; supplying a control signal to said bridge circuit from an electronic speed regulator; generating a motor stop signal in a comparator by comparing a back-e.m.f. signal from the motor with a reference voltage from a reference voltage generator; and applying a motor de-energize signal to said regulator in response to a low speed condition and in response to a given other condition; wherein said step of applying a de-energizing signal in response to a given other condition comprises detecting said given other condition and controlling a switch contact responsive to said given condition, and supplying alternating current power to said reference voltage generator from said alternating current source through said switch contact.

2. A method as claimed in claim 1, wherein upon occurrence of said given condition, said switch contact is closed so as to apply alternating current power to said reference voltage generator, and said motor de-energizing signal is applied to said regulator when motor speed is below a given speed while power is applied to said reference voltage generator.

3. A method as claimed in claim 2, wherein said other condition relates to water level in a tub of the machine, and said switch contact is closed when said tub is empty.

4. A method as claimed in claim 2, wherein said reference voltage generator includes a plurality of input alternating current power connections; and a respective plurality of switch contacts are responsive to a plurality of other conditions, each input alternating current connection providing power to generate a unique reference voltage level.

5. A method as claimed in claim 4, wherein one switch contact is closed in response to detection of low water temperature.

6. A method as claimed in claim 5, wherein a second switch contact, associated with generation of a reference voltage corresponding to a higher motor speed than that associated with the low water temperature detection, is closed in response to a tub empty condition sensed by a tub water level detector.

* * * * *